(12) United States Patent
Fleizach (10) Patent No.: US 10,636,127 B2
(45) Date of Patent: Apr. 28, 2020

(54) BIDIRECTIONAL EDGE HIGHLIGHTING WITH STRONG EDGE ATTENUATION

(71) Applicant: Gregory K. Fleizach, San Diego, CA (US)

(72) Inventor: Gregory K. Fleizach, San Diego, CA (US)

(73) Assignee: United States of America as represented by Secretary of the Navy, Washington, DC (US)

( * ) Notice: Subject to any disclaimer, the term of this patent is extended or adjusted under 35 U.S.C. 154(b) by 101 days.

(21) Appl. No.: 16/141,398

(22) Filed: Sep. 25, 2018

(65) Prior Publication Data
US 2020/0098093 A1 Mar. 26, 2020

(51) Int. Cl.
| | |
|---|---|
| G06K 9/00 | (2006.01) |
| G06T 5/00 | (2006.01) |
| G06T 5/30 | (2006.01) |
| G06T 1/20 | (2006.01) |
| G06T 7/136 | (2017.01) |
| G06T 7/40 | (2017.01) |
| G06T 7/13 | (2017.01) |

(52) U.S. Cl.
CPC .............. *G06T 5/003* (2013.01); *G06T 1/20* (2013.01); *G06T 5/30* (2013.01); *G06T 7/13* (2017.01); *G06T 7/136* (2017.01); *G06T 7/40* (2013.01)

(58) Field of Classification Search
CPC .......... G06T 5/003; G06T 7/136; G06T 7/13; G06T 1/20; G06T 5/30; G06T 7/40
USPC ........................................................ 382/266
See application file for complete search history.

(56) References Cited

U.S. PATENT DOCUMENTS

| | | | |
|---|---|---|---|
| 7,265,873 B1 | 9/2007 | Kusumo-Rahardjo et al. | |
| 7,301,573 B2 * | 11/2007 | Park .................. | G06T 3/403 |
| | | | 348/252 |
| 7,657,115 B2 | 2/2010 | Chen | |
| 8,417,030 B2 | 4/2013 | Peng et al. | |
| 2010/0066874 A1 * | 3/2010 | Ishiga ................ | G06T 5/002 |
| | | | 348/252 |
| 2010/0142790 A1 * | 6/2010 | Chang ................ | G06T 5/002 |
| | | | 382/132 |

OTHER PUBLICATIONS

Unpublished U.S. Appl. No. 15/225,621 by Gregory Knowles Fleizach entitled "Content-Aware Bidirectional Image Edge Highlighting", filed Aug. 1, 2016.

* cited by examiner

*Primary Examiner* — Jonathan S Lee
(74) *Attorney, Agent, or Firm* — Naval Information Warfare Center, Pacific; Kyle Eppele (57) ABSTRACT

A method and system for bidirectional edge highlighting. A memory receives an original input image. A processor calculates edge intensity for each edge pixel in the original input image. The processor also identifies strong edges and attenuates said strong edges. The processor can further determine whether the attenuated strong edges should be bright or dark based on the intensity of the pixel in the original image. The processor applies bidirectional edge highlighting to the image based on the intensity of the pixel in the original image. The degree of darkness or brightness of the highlighting is based on the calculated edge intensity after strong edge attenuation.

20 Claims, 8 Drawing Sheets

FIG. 1

|   |   |   |
|---|---|---|
| -1 | -2 | -1 |
| 0 | 0 | 0 |
| 1 | 2 | 1 |

FIG. 2A

|   |   |   |
|---|---|---|
| -1 | 0 | 1 |
| -2 | 0 | 2 |
| -1 | 0 | 1 |

…

DETAILED DESCRIPTION OF THE INVENTION

In brief overview, the present method and system highlight the edges of interest in a digital image by first emphasizing the mid-level edges, as opposed to the strong edges which are already easy to see. This emphasis of mid-level edges can be accomplished by using gradient operators to calculate edge intensity. Next, the strong edges are identified and then attenuated, after which all the edges are normalized, so the mid-level edges will be more pronounced.

Then, after the mid-level edges are emphasized, the present method and system highlight the edges intelligently, i.e., by accounting for the light (i.e. pixel values in the upper half of the range) and/or dark (i.e. pixel values in the lower half of the range) content in the original image, to make the edges more easily identifiable. If a transformed edge is greater than a threshold, the edge is highlighted in the original image. The edge may be considered transformed after the strong edge attenuation. The intensity of the pixel in the original image is used to decide whether the edge highlighting should be bright or dark. The calculated edge intensity may be used to determine the degree of brightness or darkness of the edge highlighting. That is, the edges with the highest intensity after strong edge attenuation and normalization will be brightened or darkened more than less intense edges to make them more visible. For example, an edge with an intensity of 0.8 will have double the brightness of an edge with an intensity of 0.4. Because edges may define boundaries between objects, edge highlighting can make the image clearer and easier to understand.

Figure 1:
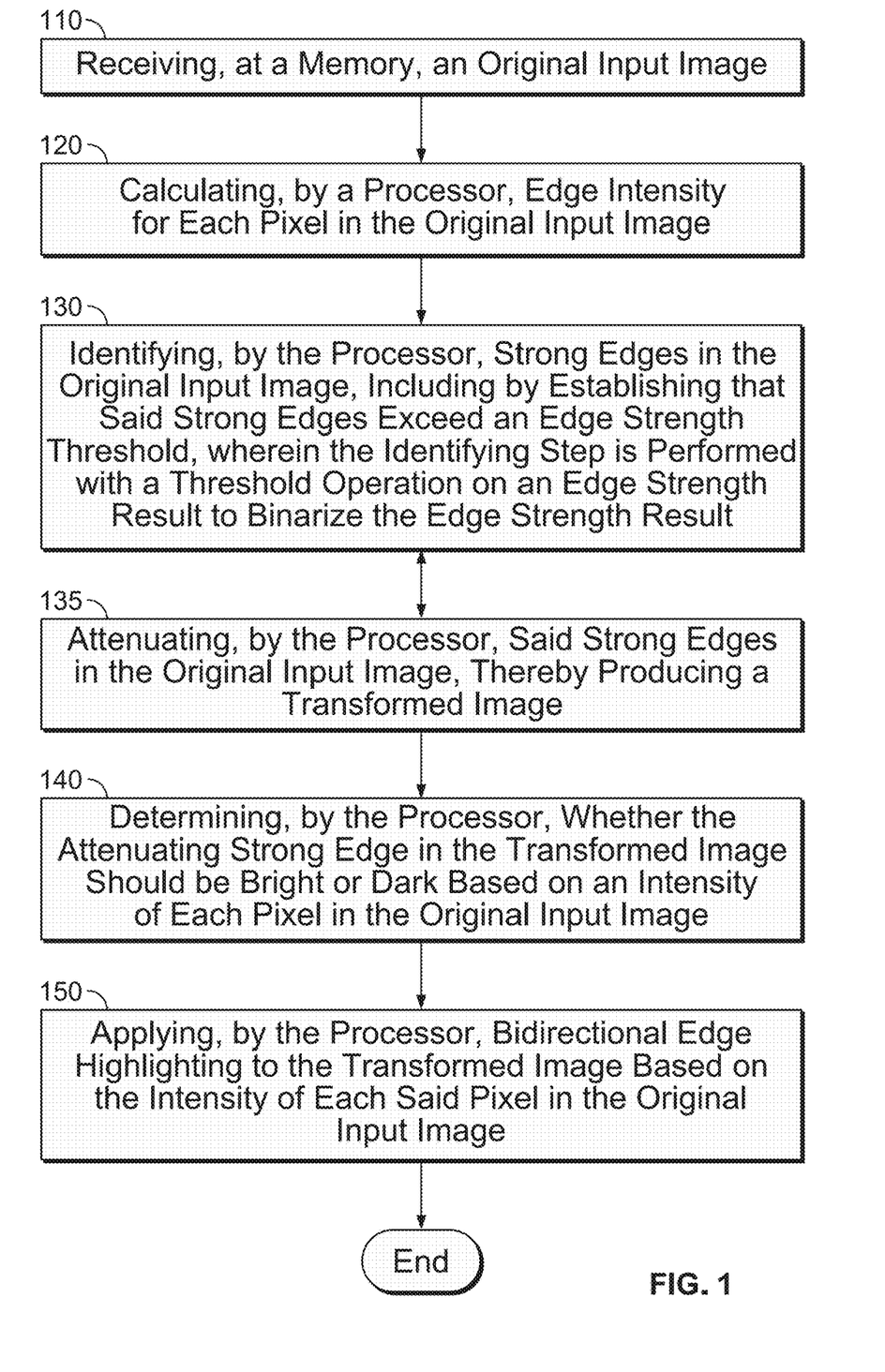

FIG. 1 illustrates a flow chart for a method for bidirectional edge highlighting with strong edge attenuation in accordance with one aspect of the present disclosure. At step 110, the method can include receiving at a memory device, an original input image. The memory device may reside on—or be a part of—an electronic or digital imaging system that also includes a processor, e.g., a digital camera. Alternatively, by way of non-limiting example, the memory device may be a part of a personal computer or other computer system used to post-process a digital image. The original input image may be a frame of a video, a monochromatic image, or a color image such as a panchromatic image. The memory device may be, for example, flash memory, random access memory (RAM), or a memory residing in a graphics processing unit (GPU). The memory device should be selected based on its suitability to carry out the steps set forth in FIG. 1 and to store the information required in connection with FIG. 1. The memory device can also be selected based on its suitability for bidirectional edge highlighting as described herein and as determined by one of ordinary skill in the art.

At step 120, the method includes calculating, by a processor, edge intensity for each pixel in the original input image. The edge intensity for pixels above a certain predetermined threshold are denoted as "strong" edges. Edge intensity, as used herein, has a different meaning from pixel intensity. Pixel intensity is intensity for any pixel in an image. Edge intensity relates to the strength of the edge pixels. Strong edge pixels are pixels that are part of an edge that meets the definition of a strong edge as defined herein. The edge intensity may be calculated in a number of ways. For example, the edge intensity may be calculated using fuzzy logic methods. Edge intensity may also be calculated, pixel-by-pixel, using gradient operators, e.g., Sobel gradient operators and Canny gradient operators. Higher gradients usually indicate that an edge is present.

Figure 2A:
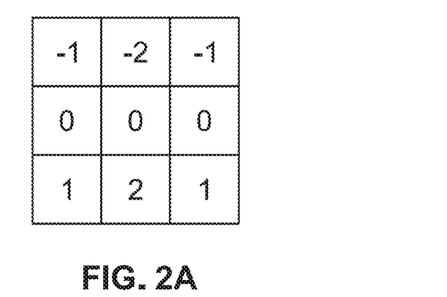
Figure 2B:
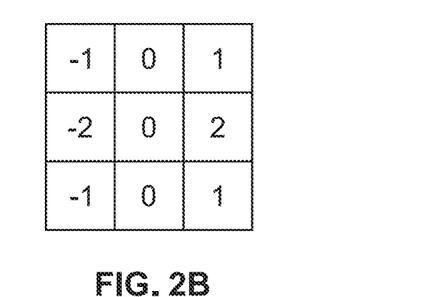

FIGS. 2A and 2B can show gradient operators, e.g., the Sobel operators, to operate on a monochrome image. Alternatively, the Sobel operators could operate on an intensity image from a color image or a single color plane. The result of the gradient operation is two images that are the same size as the original image. In FIG. 2A, the left Sobel operator finds horizontal edges or x-gradients. In FIG. 2B, the right Sobel operator finds vertical edges or y-gradients. The Sobel operators may be combined using the following formula:

$$\text{edge\_strength} = \sqrt{(\text{sobel\_}x^2 + \text{sobel\_}y^2)} \qquad \text{(Equation 1)}$$

Using this formula, it is possible to detect edges at any orientation, where sobel_x is the result from the left gradient operator FIG. 2A, and sobel_y is the result from the right gradient operator in FIG. 2B. The maximum value of edge_strength depends on the range of the input image. The output of combining the gradient operators is a single image the same size as the original image, which can contain the relative strengths of all the edges.

It should be appreciated that other gradient operators may be used instead of Sobel gradient operators (e.g., Roberts cross gradient operators, Laplacian, etc.). Alternative methods may be used to combine the results from the two gradient operators depending on whether horizontal, vertical, or some other edges need to be highlighted preferentially. For example, another method for combining the results from the two gradient operators is as follows:

$$\text{edge\_strength} = |\text{sobel\_}x| + |\text{sobel\_}y| \qquad \text{(Equation 2)}$$

where |•| is an absolute value operator.

Referring again to FIG. 1, at step 130, the method can include identifying, by the processor, strong edges. From the edge_strength image, the goal can be to highlight the edges of mid-level intensity that may be of interest (i.e. mid-level edges) in the original image. One way to approach the problem of edge highlighting can be to threshold the edge_strength image and for every edge_strength pixel above the threshold, the corresponding pixel in the original image can be darkened proportionally to the strength of its edge. A drawback of this method is that it tends to emphasize the edges that are already prominent. Often, what is really of interest can be the edges which are not as prominent in the original image.

This identification of strong edges may be accomplished with a simple threshold operation on the edge_strength result to binarize the result. For example, if it is established that the edge intensity is greater than or exceeds a certain predetermined $\text{thresh}_{strong\_edge}$ value, then the pixel value becomes one (1). As an example, the value of 0.4 may be used as the predetermined $\text{thresh}_{strong\_edge}$ value, particularly for a low noise image. For a high noise image, the attenuation factor may be higher. If the edge intensity is lower than a predetermined threshold, the pixel becomes zero (0). To emphasize this point, binarization happens when a pixel value is set to one (1) or zero (0) based on edge intensity. If it is determined that the edge intensity is greater than or exceeds a certain predetermined threshold, then the pixel value is set to one and can be considered part of a strong edge. If the pixel value is not greater than, or does not exceed this threshold, then the pixel value is set to zero. If the pixel value is equal to the threshold value, the pixel value is set to zero as well.

Figure 3A:
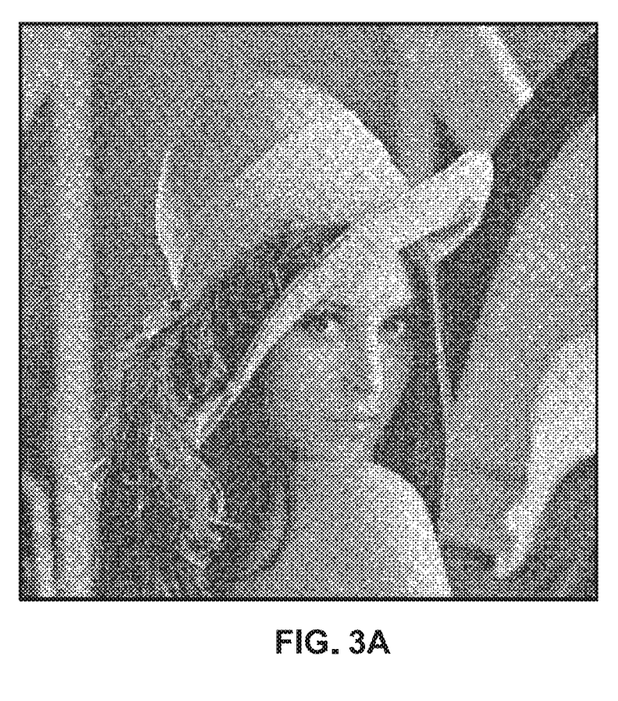
Figure 3B:
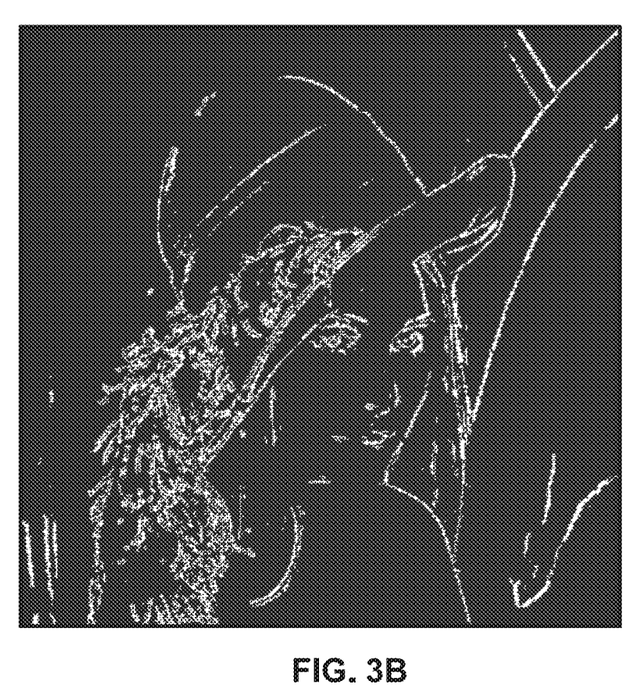

Referring now to FIGS. 3A and 3B, in FIG. 3A, the original input image is shown prior to binarization. An example of this binarized result can be seen in FIG. 3B. Binary just means the pixel can have two values (0 or 1) and binarized means that it has been converted from multiple values to only two values (0 or 1). That is, only black or white and no gray values in between.

Referring back to FIG. 1A, at step 135, the method can include attenuating, by the processor, strong edges. A transformed image may thereby be provided. A transformation can be applied to the edge_strength image to attenuate the strong edges that are already evident and enhance the mid-level intensity strength edges that may actually be of more interest when analyzing the image. In the present example, after binarization, the strong edge image is dilated with a three by three (3×3) structuring element which has the value of one (1) in every position. A structuring element is a matrix that may identify the pixel in the subject image and define the general position used in the processing of each pixel.

The proposed system and method use a dilation on the binarized strong edge image to mask the weak edges that can be created near strong edges by gradient operators. Eliminating this "edge ringing" makes the highlighted edges sharper and easier to delineate. The image dilation after the generation of the binary strong edge image is not necessary and may be left out to avoid the computations, but it does improve the result.

Figure 4:
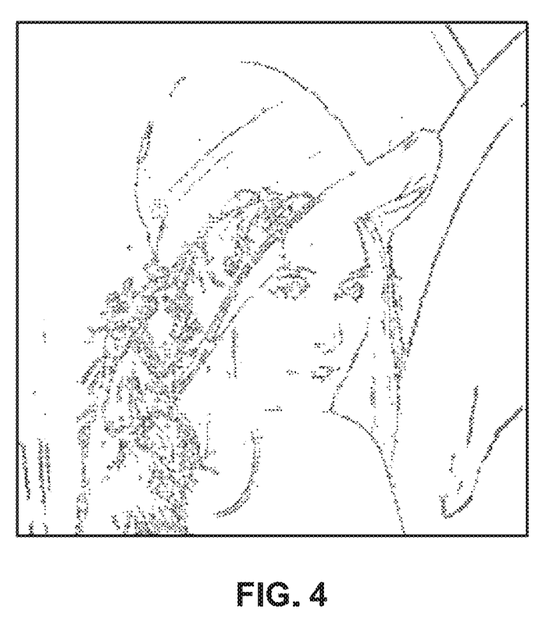
FIG. 4 can be an edge enhancement map in accordance with one embodiment of the present disclosure.

Attenuation of strong edges may be performed by creating an edge enhancement map from the binarized strong edge image. The edge enhancement map may guide the system in determining which edges need to be attenuated and which edges need to be amplified. Essentially, the edges are classified as 1 except those edges that get attenuated. Every pixel in the binarized strong edge image, or each pixel that represents part of an edge (edge pixel), is multiplied by an attenuation factor, $\text{atten}_{strong\_edge}$ (0.4 may work well in the middle range between 0, which is black, and 1 which is white). Since this is a binary image and the strong edges have a value of 1 while all other pixels are 0, this has the effect of scaling only the strong edges. Next, all 0-valued pixels (i.e. any pixel that is not a strong edge) are given the value of 1. The result is an edge enhancement map that has been generated where the location of the strong edges has been attenuated by a value of $\text{atten}_{strong\_edge}$ and all the other pixels have a value of 1, as shown in FIG. 4.

At this point, for each pixel in the original image, the output from the gradient operators is multiplied by the edge enhancement map to perform the attenuation of the strong edges. The result of the multiplication is an edge enhancement factor, e, which is normalized to the range [0,1], instead of 0 to the strong threshold that was set, using the following equation;

$$e[n,m]=(e[n,m]-\min(e(:)))/(\max(e(:))-\min(e(:))) \quad \text{(Equation 3)}$$

where n and m are pixel indices, min(e) is the minimum of all the pixel values in e and max(e) is the maximum of all the pixel values in e.

After normalization, where values go from 0 to 1 again, mid-level edges become the strongest edges in the image. These edges become more amplified. For example, if strong edge threshold is 0.7 and the attenuation factor is 0.4, it would get attenuated to 0.28 in this example. The last step in creating the edge enhancement factor is to set any value less than an enhancement threshold (e.g., 0.3) to 0. However, a pixel with a value of 0.6 would remain at 0.6. This prevents the enhancement of weak edges, which are typically noise and can cause a grainy result. The values of edge enhancement factor, e, can be clipped to a certain value if it has a long-tail distribution. That is, for the transformation to enhance mid-level edges to be successful, some of the largest values in e may have to be ignored to get a meaningful transformation.

Figure 5A:
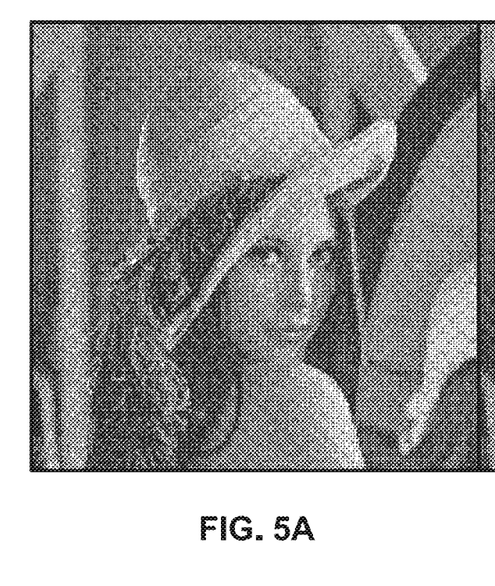
FIG. 5A can illustrate an example of an original input image.
Figure 5B:
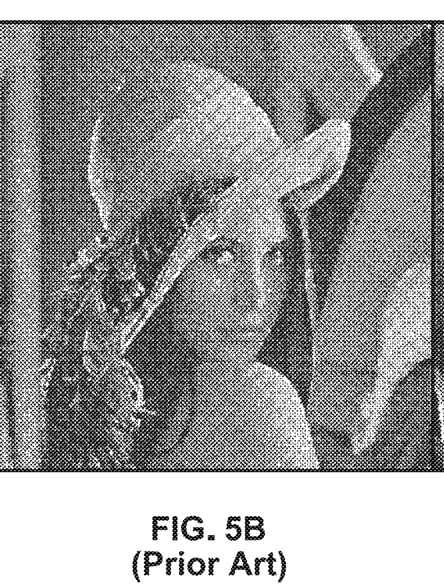
FIG. 5B illustrates gradient output edge highlighting of the image of FIG. 5A, using methods known in the prior art.
Figure 5C:
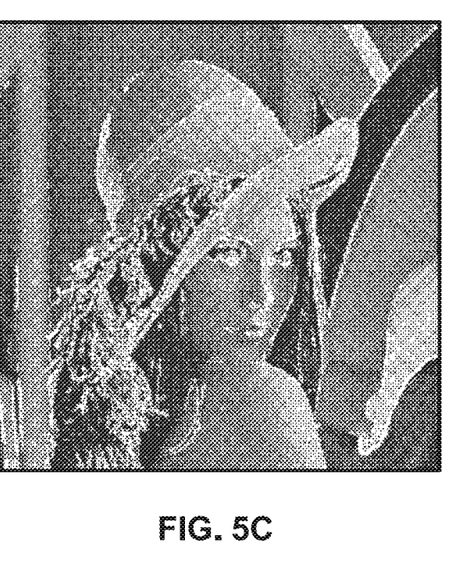
FIG. 5C can illustrate unidirectional highlighting after strong edge attenuation in accordance with embodiments of the present invention.

An example of the difference that the strong edge attenuation can make is shown in FIGS. 5A, 5B and 5C. FIG. 5A shows the original input image. FIG. 5B shows the image using only gradient output, a technique which was performed in the prior art. As is evident in FIG. 5B, using the gradient output directly (center) as in the prior art adds very little information. There is an edge around the brim of the hat near the eyes that is enhanced, as well as in the edges in the feathers.

FIG. 5C can show the same image of FIG. 5A, but with the unidirectional edge highlighting and strong edge attenuation of the present invention according to several embodiments having been applied. After the strong edge attenuation and mid-level enhancement transformation, many more edges are evident including edges on the face (nose, mouth, eyes, and eyebrows), edges on the reflection in the mirror, and even edges on the blurry wall in the background. Unidirectional edge highlighting is shown here to compare the naive gradient and the strong edge attenuation approach.

Referring back to FIG. 1, at step 140, the system considers the brightness of the original image in applying the edge highlighting. Unidirectional edge highlighting often involves highlighting all edges in shades of white or all edges in shades of black. Unidirectional edge highlighting is suboptimal because images often contain both bright and dark regions. In a bright region, white highlighting can be difficult to see and might in fact diminish edges visible in the original image.

A more appropriate approach uses bidirectional edge highlighting. That is, based on the content of the original image at the edge of interest, the edge highlighting is either dark or bright. Still referring to step 140, the system determines whether an attenuated edge should be bright or dark based on the intensity of the pixel in the original input image. For example, in a light region of the image, the highlighting would be dark to make the edge more prominent and vice versa for a dark region of the image. The simplest and most effective way to implement content-aware edge highlighting is to simply examine the intensity of the pixel in the original image at the current edge enhancement factor pixel of interest. An intuitive scheme is to check, for each edge pixel to be highlighted, whether the intensity value in the original image is above the mid-point in the intensity range. If the intensity value is above the mid-point (e.g., 0.5 for range [0,1] or 127 for range [0,255]) then the edge highlighting should be dark, but if the intensity value is below the mid-point then the edge highlighting should be bright.

At step 150, the system applies bidirectional edge highlighting based on the intensity of the pixel in the original input image. The actual edge highlighting can be accomplished as follows. Assuming the edge enhancement factor, e, and the original image, a, are both normalized to the same range, say, [0,1], then for pixels in the original image where the intensity is less than the mid-point of the range, the edge highlighted image, a_edge is as follows:

```
if(a[n,m] < 0.5)
{ a_edge[n,m] = a[n,m] + e[n,m];
}
``` and for pixels in the original image where the intensity is greater than the mid-point of the range, the edge highlighted image is as follows:

```
else
{ a_edge[n,m] = a[n,m]·(1 − e[n,m]);
}.
```

Figure 6A:
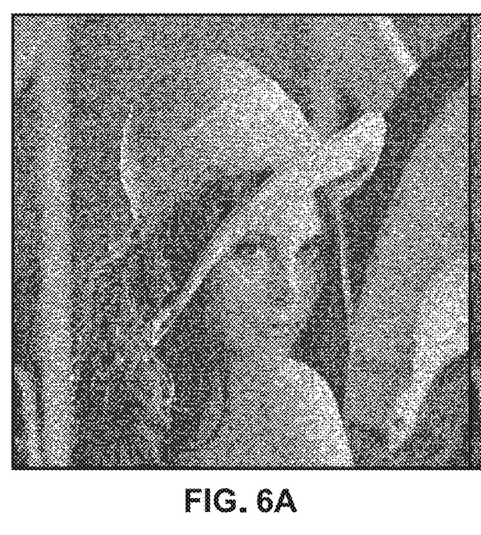
FIG. 6A can illustrate an example of an original input image.
Figure 6B:
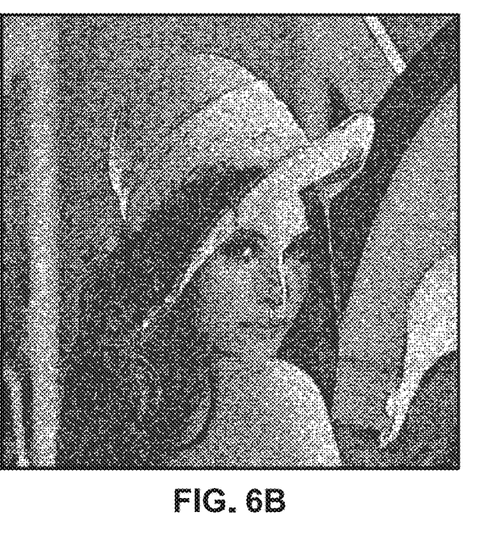
FIG. 6B can illustrate strong edge attenuation of FIG. 6A using methods of the present disclosure but with unidirectional dark edge highlighting results FIG. 6C can have strong edge attenuation but with unidirectional highlighting and bright edge highlighting results.
Figure 6C:
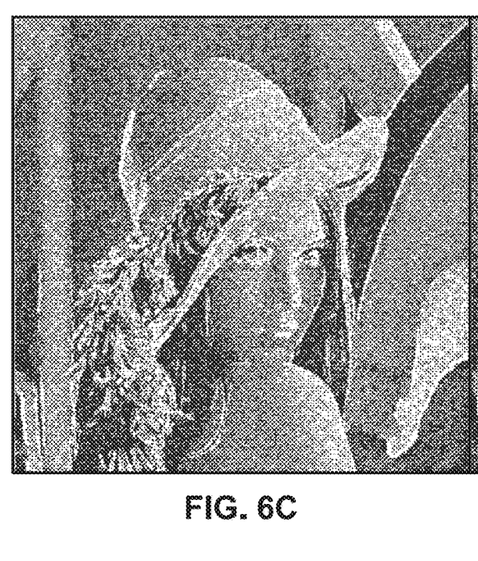
Figure 6D:
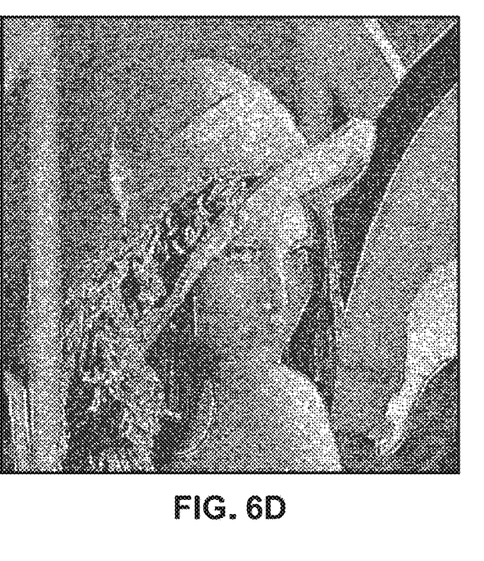
FIG. 6D can illustrate bidirectional edge highlighting results in accordance with one embodiment of the present disclosure.

The results of bidirectional highlighting compared to unidirectional highlighting may be seen in FIGS. 6A-6D. In FIG. 6B, the unidirectional dark highlighting with strong edge attenuation applied to FIG. 6A can make the image look blurred. The edges can be less clear in this version than in the original FIG. 6A. The unidirectional bright highlighting with strong edge attenuation in FIG. 6C can look a little better for this example image; however, some edges can be lost such as on the shoulder, the right side of the nose, and the white diagonal strip in the top right corner of the image. This image also looks a bit washed out with all the white. The proposed bidirectional edge highlighting of the present method and system with strong edge attenuation (FIG. 6D) may produce the edge highlighted image of FIG. 6D. It enhances edges as one would intuitively expect, helping an observer focus on the salient portions of the image. Edges on the brim of the hat are now evident as is the edge along the shoulder. The edge along the nose and the white diagonal strip on the top right are both now clear as well. In general, the edges are much easier to pick out for an observer. It essentially retains the best edges from the bright and dark unidirectional results. In a monochrome (i.e. black and white) image, the edges may be highlighted bidirectionally with two colors instead of white and black. For example, blue and red may be used to highlight edges to make them more noticeable. That is, just because the input image is monochrome does not mean the edge-enhanced images must be as well.

The bidirectional edge highlighting may be applied in methods other than that shown above. For example, to make the bright edges dark the inverse of edge enhancement factor, e, may be used instead of subtracting from one. That is, for a pixel in the original image that is greater than the mid-point of the range, the expression $$a\_edge[n,m]=a[n,m]/e[n,m] \quad \text{(Equation 4)}$$

may be used instead. Alternatively, the dark edges may be made bright by dividing $$a\_edge[n,m]=a[n,m]/(1-e[n,m]) \quad \text{(Equation 5)}$$

instead of adding the edge enhancement factor.

The advantages of the proposed method over old methods are that it highlights edges of interest, which are difficult to see in the original image. That is, the proposed method highlights the images that are of mid-level strength; not quite strong, but not quite weak. Current methods simply enhance all edges above a certain threshold equally, which does not add any valuable information to the image since these edges are already the easiest to pick out. This invention, instead, identifies and then attenuates the strong edges so the mid-level edges stand out more.

Additionally, the proposed method uses a simple, but effective, method of taking into account the content of the original image to determine whether an edge should have bright or dark highlighting. This bidirectional method is in contrast to traditional edge highlighting methods, which are unidirectional (e.g., all edges are highlighted dark or bright). The bidirectional method yields highlighted edges that are much easier to see. This edge highlighting method is for a monochrome image, but this invention may be applied to color or panchromatic images by operating on the intensity image or on each plane individually. The sensitivity of the method can be varied by manipulating the threshold value. Additionally, the degree of brightness or darkness may vary according to the calculated edge intensity.

Figure 7:
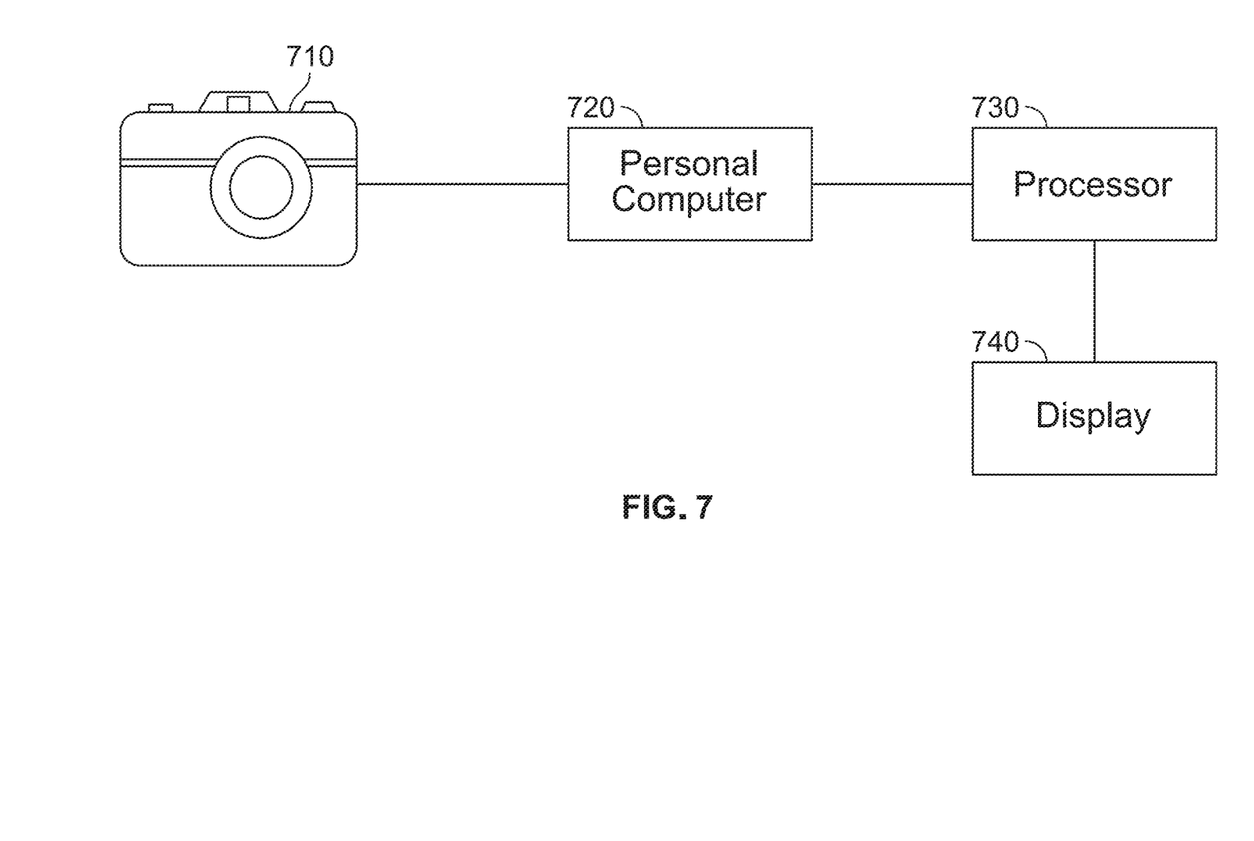
FIG. 7 can illustrate a system for bidirectional edge highlighting in accordance with one embodiment of the present disclosure; and, FIG. 8 is a block diagram for a method for bidirectional edge highlighting in accordance with one embodiment of the present disclosure.

FIG. 7 can be an exemplary system for bidirectional edge highlighting with strong edge attenuation in accordance with one embodiment of the present disclosure. The system 700 may include an imaging system 710, a personal computer 720 that is operably coupled to the imaging system 710, a processor 730 that is operably coupled to the imaging system 710 and a display 740 that is operably coupled to the imaging system 710. The imaging system 710 could be any digital imaging system. Digital imaging system 710 can connect to personal computer 720. The original input image may be fed from the imaging system 710 to the personal computer 720. The personal computer 720, which may include its own memory and processor, may feed the image to another processor 730 such as a graphics processing unit, for example. As an alternative to the system of FIG. 7, the personal computer 720 may be removed and the imaging system 710 and processor 730 can be connected immediately adjacent to each other. Some processing that was done by the personal computer 720 may be off-loaded to the imaging system 710 (which may include a processor) and/or the processor 730 shown in FIG. 7.

Software (not shown in FIG. 7) may be resident in the memory of personal computer 720, which may cause the processor 730 to perform one or more steps of the method for bidirectional edge highlighting with strong edge attenuation as set forth herein. If mechanical/electrical devices (whether existing as part of the imaging system or added thereafter) are used to further aid in in this process, such devices may be located within the body of imaging system 710 or elsewhere as can be appreciated by one of ordinary skill in the art.

Personal computer 720, as noted hereinabove, can have sufficient memory to hold at least the input image and output imaging of imaging system 710 that is used for the iterative process. Memory 720 may also include other elements such as processing steps or instructions related to bidirectional edge highlighting with strong edge attenuation. Examples of such processing steps are described in the flow chart of FIG. 1. The speed of the processor 730 needed may depend on the application in which the processor 730 is used, as can be appreciated by one of ordinary skill in the art.

Figure 8:
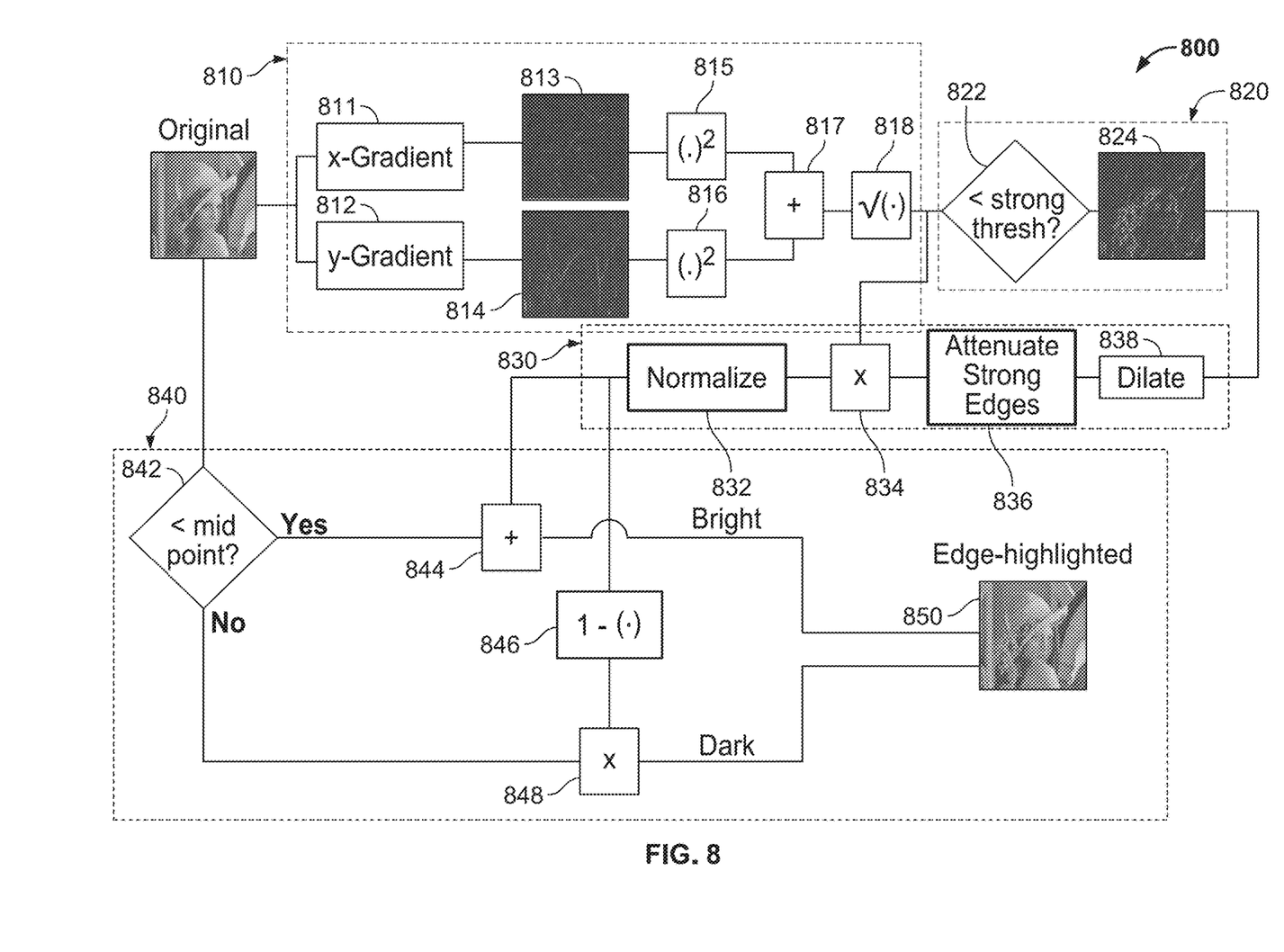

FIG. 8 can be a flow chart of an embodiment of a method 800 for bidirectional edge highlighting with strong edge attenuation in accordance with one embodiment of the present disclosure. The first step 810 of the edge highlighting method (step 120 in FIG. 1) shown in FIG. 8 can provide for calculating edge intensity for each pixel in the original input image. Edge intensity may be calculated using gradient operators. At 811, the gradient in the horizontal direction is calculated. At 812, the gradient in the vertical direction is calculated. At 813, the resulting output image is shown after the horizontal gradient is calculated. At 814, the resulting output image is shown after the vertical gradient is calculated. At 815 and 816, square operators can be applied to the x-gradient image 811 and the y-gradient image 812, respectively. At 817, an addition operation is performed of the two squared gradient outputs 815 and 816. At 818, a square root operation is performed.

Once the pixel edge intensities have been calculated in step 810 and as described above, the next step 820 in FIG. 8 can provide for identifying strong edges based on the calculated edge intensity (step 130 in FIG. 1). At 822, the system determines whether the edge strength of an edge is greater than an edge strength threshold. Edge pixels that meet this criterion can be assigned a pixel value of one (1). Edge pixels that do not meet this criteria, i.e., that are less than or equal to the edge strength threshold, can be assigned a pixel value of zero (0). At 824, the resulting image has pixel values that are either zero or one to create the binarized strong edge image a shown at 824.

Next, the strong edges are attenuated at step 830 in FIG. 8 (step 135 in FIG. 1). At 832, the output from the gradient operators is multiplied by the edge enhancement map to perform the attenuation of the strong edges. The result of the multiplication is an edge enhancement factor, e, which is normalized to the range [0,1]. After normalization, where values go from 0 to 1 again, mid-level edges become the strongest edges in the image. At 834, an attenuation factor is multiplied by the original calculated edge intensity. At 836, strong edges are attenuated. At 838, the strong edge image is dilated with a structuring element.

The next step 840 (steps 140 and 150 in FIG. 1) can provide for highlighting a given edge in an image if the corresponding transformed edge is greater than a preselected threshold. At 842, it is decided if the region is a bright region or dark region. Dark regions are generally highlighted with bright highlighting. Likewise, bright regions are usually highlighted with dark highlighting. If the intensity value is below a mid-point at 842, then the edge highlighting is bright and calculations are performed at 844 to result in bright highlighting. For example, at 844, one could take the attenuated edge strength image and add a value if original pixel intensity is greater than midpoint. One would subtract that value if the original pixel intensity were lower than midpoint at 842.

At 842, if the intensity value is above the mid-point then the edge highlighting is dark. At 846 and 848, operations are performed to ensure that the edge highlighting is dark. At 850, the edge highlighting is applied based on both the intensity of each pixel which helps to determine whether to use dark or light highlighting, thereby producing an edge highlighted image. The degree of darkness or brightness of the highlighting is based on the calculated edge intensity.

The present method and system can help to identify different chips on a computer board, to identify a person hiding, or any number of forms. The present method and system could also be used for lane tracking.

The foregoing description of various embodiments has been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed as new and desired to be protected by Letters Patent of the United States is:

1. A method for bidirectional edge highlighting with edge attenuation, the method comprising:
    receiving, at a memory device, an original input image;
    calculating, by a processor, an edge intensity for each pixel in the original input image;
    identifying, by the processor, the edge pixel as a strong edge pixel in the original input image when the calculated edge intensity exceeds an edge strength threshold, including by assigning, by the processor, a pixel value of one to each strong edge pixel, wherein the identifying step further includes assigning, by the processor, a pixel value of zero to each edge pixel when the calculated edge intensity is equal to or less than the edge strength threshold, wherein the assigning steps thus binarize an edge strength result;
    attenuating, by the processor, said strong edge pixels in the original input image, thereby producing a transformed image, wherein the attenuating step includes multiplying, by the processor, an attenuation factor by the calculated edge intensity for each said strong edge pixel;
    determining, by the processor, whether the attenuated strong edge pixels in the transformed image should be bright or dark based on an intensity of each pixel in the original input image; and,
    applying, by the processor, bidirectional edge highlighting to the transformed image based on the intensity of each said pixel in the original input image, thereby producing an edge highlighted image.

2. The method of claim 1, wherein the edge intensity is calculated using gradient operators.

3. The method of claim 2, wherein the gradient operators are Sobel gradient operators.

4. The method of claim 2, wherein the gradient operators are Roberts cross gradient operators.

5. The method of claim 2, wherein the gradient operators are Laplacian gradient operators.

6. The method of claim 2, wherein the attenuating step includes generating, by the processor, an edge enhancement map from a binarized strong edge image.

7. The method of claim 6, wherein the applying step further includes determining, by the processor, the degree of brightness or darkness of the bidirectional edge highlighting in the transformed image based on the calculated edge intensity.

8. The method of claim 6, wherein the attenuating step includes:
multiplying, by the processor, an output from the gradient operators by the edge enhancement map, thus generating a multiplication result;
normalizing, by the processor, the multiplication result; and,
setting, by the processor, a value less than an enhancement threshold to zero, thus generating an edge enhancement factor.

9. A system for bidirectional edge highlighting with edge attenuation, the system comprising:
a memory configured to receive an original input image;
a processor configured to;
calculate edge intensity for each edge pixel in the original input image;
identify each said edge pixel as a strong edge pixel in the original input image when the calculated edge intensity exceeds an edge strength threshold, wherein the processor is further configured to assign a pixel value of one to each said strong edge pixel, and wherein the processor is further configured to assign a pixel value of zero to each edge pixel when the calculated edge intensity is equal to or less than the edge strength threshold, thus binarizing an edge strength result;
attenuate said strong edge pixels in the original input image, thereby producing a transformed image, including to:
multiply an output from the gradient operators by the edge enhancement map to generate a multiplication result;
normalize the multiplication result;
set a value less than an enhancement threshold to zero to generate an edge enhancement factor;
determine whether the attenuated strong edge pixels in the transformed image should be bright or dark based on the intensity of each pixel in the original input image; and
apply bidirectional edge highlighting to the transformed image based on the intensity of each pixel in the original input image, thereby producing an edge highlighted image.

10. The system of claim 9, wherein the edge intensity is calculated using gradient operators.

11. The system of claim 10, wherein the gradient operators are Sobel gradient operators.

12. The system of claim 10, wherein the gradient operators are Roberts cross gradient operators.

13. The system of claim 10, wherein the gradient operators are Laplacian gradient operators.

14. The system of claim 9, wherein the processor is further configured to perform a threshold operation on the edge strength result to binarize the edge strength result, and wherein the processor is further configured to generate an edge enhancement map from a binarized strong edge image.

15. The system of claim 14, wherein the processor is configured to attenuate said strong edge pixels by multiplying each strong edge pixel by an attenuation factor.

16. A method for bidirectional edge highlighting with edge attenuation, the method comprising:
receiving, at a memory device, an original input image;
calculating, by a processor, an edge intensity for each edge pixel in the original input image, wherein said calculating step is performed using gradient operators;
identifying, by the processor, the edge pixel as a strong edge pixel in the original input image when the calculated edge intensity exceeds an edge strength threshold, including by assigning, by the processor, a pixel value of one to each edge pixel in said strong edge, wherein the identifying step further includes assigning, by the processor, a pixel value of zero to each edge pixel when the calculated edge intensity is equal to or less than the edge strength threshold, thus binarizing an edge strength result;
attenuating, by the processor, said strong edge pixels in the original input image, thereby producing a transformed image, wherein the attenuating step includes:
multiplying an output from the gradient operators by the edge enhancement map, thus generating a multiplication result;
normalizing the multiplication result;
setting a value less than an enhancement threshold to 0, thus generating an edge enhancement factor;
determining, by the processor, whether the attenuated strong edge pixels should be bright or dark based on an intensity of each pixel in the original image; and
applying, by the processor, bidirectional edge highlighting to the transformed image based on the intensity of the pixel in the original image, thereby producing an edge highlighted image.

17. The method of claim 16, wherein the gradient operators are Sobel gradient operators.

18. The method of claim 16, wherein the gradient operators are Roberts cross gradient operators.

19. The method of claim 16, wherein the gradient operators are Laplacian gradient operators.

20. The method of claim 17, wherein the identifying step is performed with a threshold operation on the edge strength result to binarize the edge strength result, and
wherein the attenuating step includes generating, by the processor, an edge enhancement map from a binarized strong edge image and dilating, by the processor, the binarized strong edge image with a structuring element.

* * * * *